June 13, 1939. A. C. HOECKER 2,162,257
PARKING DEVICE
Filed Feb. 8, 1932
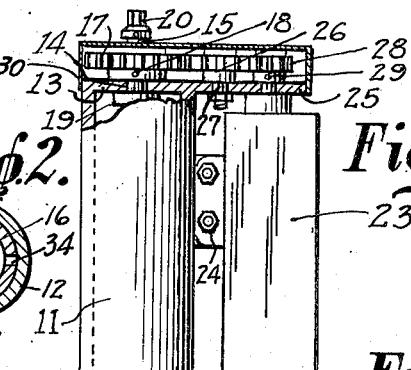
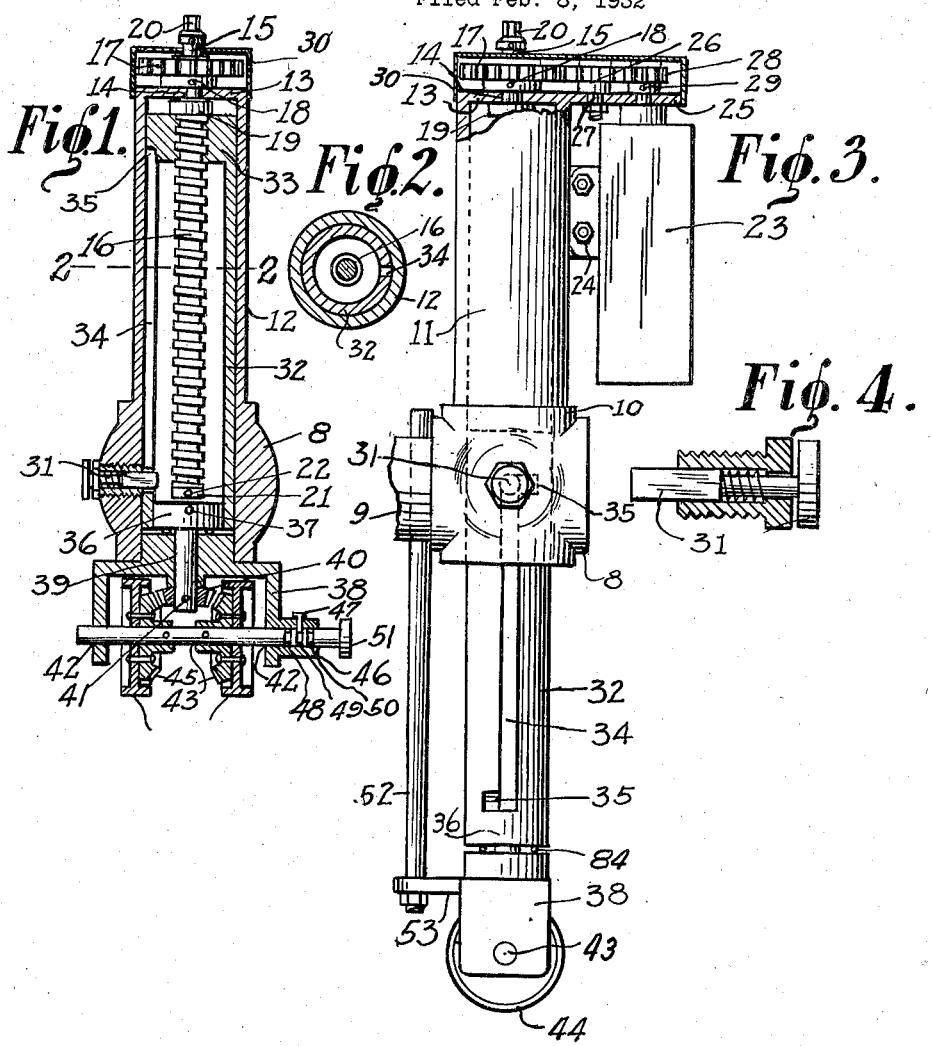
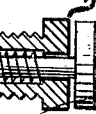
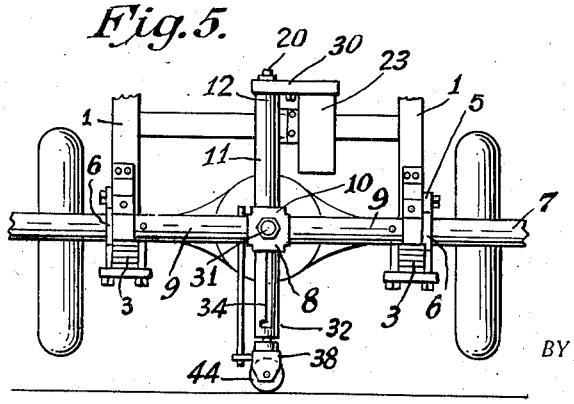
INVENTOR.
Albert C. Hoecker
BY Patented June 13, 1939

2,162,257

UNITED STATES PATENT OFFICE 2,162,257

PARKING DEVICE

Albert C. Hoecker, St. Louis, Mo.

Application February 8, 1932, Serial No. 591,651

4 Claims. (Cl. 180—1)

This invention relates to parking devices for automobiles.

The primary object of the invention is to provide a parking device for a vehicle which will enable the vehicle, having such an attachment, to be swung from one position to another when lifted.

Another object of the invention is to provide a bumper with a parking device.

Other and further objects will appear in the specification and be specifically pointed out in the appended claims, reference being had in the accompanying drawing, exemplifying the invention and in which:

Fig. 1 is a vertical central sectional view of the parking device.

Fig. 2 is a section on line 2—2 of Fig. 1.

Fig. 3 is a detail sectional elevation at right angles to Fig. 1 showing jack in lifting position.

Fig. 4 is a central section of spring plunger.

Fig. 5 is a rear elevation of the parking device mounted on the rear of an automobile with parking device in lifting position.

Referring by numerals to the accompanying drawing, 1 designates the side frames of the vehicle chassis and secured to the rear end of each frame by bolts 2 is a spring 3, said springs being mounted on the rear axle 4.

The disclosure of this improved parking device is shown as applied to the rear end of the vehicle or automobile, although the application thereof can be to the front of the vehicle as well.

Secured to each side of the frame 1 is a bumper supporting arm 5, formed in each of said arms is a bearing 6, and held in said bearings is a bumper rail 7.

The bumper rail 7 is of tubular construction and comprises a cross fitting 8, and extending from each horizontal branch of the fitting is a tubular length 9. The bumper rail 7 is turnably mounted in the bearings 6 of the arms 5, and disposed in the vertical branch 10 of the cross 8 is a lifting jack 11. The lifting jack comprises a tubular length 12 vertically secured in the cross 8. One end of the tubular length 12 is provided with a shoulder 13 and formed in said shoulder is a bearing 14 and mounted in said bearing is an extending end 15 of a spiral shaft 16. The extending end 15 of said shaft being secured to a gear 17 by a pin 18, said gear engaging one side of the shoulder 13, whereas a collar 19 on the shaft 16 engages the opposite side of said shoulder. At the extreme end of the portion of the shaft which extends above the shoulder 13 is a wrench engaging hexagon nut 20 and at the lower end of the spiral shaft 16 is a collar 21 secured to said shaft by a pin 22.

Mounted on the side of the tubular length 12 is a motor 23 bolted to the tubular length 12 by bolts 24. At the top, and extending transversely of the tubular length 12 and motor 23, is a gear support 25. In the center of said support is an idler gear 26, secured to said support by a stud 27. One end of the motor shaft also extends up into the gear support 25 and is provided with a gear 28 secured to said shaft by a pin 29. Thus, it will be seen that there are three gears 17, 26, and 28 all mounted on the base of the gear support 25. These gears provide the driving means for the spiral shaft 16 and are covered by the gear cover 30.

A spring plunger 31, such as is more clearly illustrated in the enlarged section Fig. 4, is secured in the cross 8.

Mounted within the tubular length 12 is a tubular leg 32, one end of said leg having a threaded opening 33 for the reception of the spiral shaft 16 and longitudinally of said leg is a slot 34, at each end of said slot is a cam shaped surface 35 and, at the lower end of the leg 32 is a portion of a drive shaft 36, said portion being secured to the leg 32 by a pin 37.

Mounted at the lower end of the leg 32 is a forked bracket 38, at the upper end of the bracket 38 is a bearing 39 for the reception of the portional drive shaft 36, and on the end of said drive shaft is a bevel gear pinion 40 which is secured to the drive shaft 36 by a pin 41. The lower ends of the forked bracket are provided with bearings 42 for the reception of a shaft 43, secured to said shaft are two road engaging wheels 44, both of said wheels being provided with bevel gears 45 adapted to engage the bevel gear pinion 40, on the side of the forked bracket 38 is an extension bearing 46 and, secured to said bearing is a spring plunger 47 and of the type clearly shown in Fig. 4. The shaft 43 has three grooves 48, 49, and 50 cut completely around said shaft for the reception of the spring plunger 47. The bearing 46, spring plunger 47, and grooved shaft 43 are to be utilized as a gear shifting device and Fig. 1 clearly illustrates the gears in a neutral position, the plunger 47 being in the neutral groove 49.

In the operation of the mechanism according to the invention, when it is desired to turn the vehicle in a particular direction the spring plunger 47 on the forked bracket 38 is raised out of the neutral groove 49 in the shaft 43 and by means of the knob 51 on the shaft 43 one of the bevel gears 45, which is attached to the shaft 43, is forced into mesh with the bevel gear pinion 40. The spring plunger is then released and allowed to drop in either groove 48 or 50 depending on which way the vehicle is to be turned.

An electric switch, which can be placed in any convenient position on the vehicle not shown, is then closed causing the armature of the electric motor to revolve, thus turning the gears on the gear support, and as one of the gears is keyed to the spiral shaft 16 the spiral shaft will revolve. Thus if the motor armature happens to be turning in a direction which will cause the spiral shaft, which has a left hand thread, to turn in a clockwise direction, and as the spiral shaft is threaded in the opening in the tubular leg 32, and as the tubular leg 32 is provided with a longitudinal slot 34 and is prevented from turning by reason of the spring plunger 31, projecting in said slot, the tubular leg will be forced downwardly until the road wheels 44 engage the roadway and the vehicle is lifted from the ground.

Continued movement of the tubular leg 32 will cause the threaded portion 33 of the tubular leg 32 to engage the keyed collar 21 of the spiral shaft, thus locking the tubular leg 32 with the spiral shaft 16. At the same time the upper cam surface 35 registers with the spring plunger 31 as shown in Fig. 3. At this point the cam surface raises the spring plunger 31 permitting the leg 32 to revolve with the spiral shaft 16 rotating the bevel gear pinion 40, thus rotating the road wheels 44.

As previously stated, the direction of turning the vehicle depends on which groove in the shaft 43 the spring plunger 47 engages. Thus, if the spring plunger 47 engages groove 48 the vehicle will turn in one direction; if the spring plunger engages groove 50 the vehicle will turn in the opposite direction.

To return the lifting device to normal position, or as shown in Fig. 1, the electric switch, not shown, is reversed, or in other words, the field connections of the motor are reversed causing the motor armature to reverse, thus reversing the rotation of the spiral shaft 16 which in turn draws the tubular leg 32 back into the tubular length 12 until the threaded portion 33 of the tubular leg 32 engages the collar 19 on the spiral shaft 16 as shown in Fig. 1. At this point the tubular leg 32 will again be locked to the spiral shaft 16 and as the lower cam surface 35 registers with the spring plunger 31 the spring plunger 31 will rise out of the horizontal slot 34 permitting the tubular leg 32 to rotate with the spiral shaft 16 thus preventing damage to the lifting device in the event the motor is not immediately stopped when the tubular leg is in normal position as shown in Fig. 1.

The forked bracket 38 is prevented from turning by means of the rod 52 which moves vertically through the bumper rail 7 and is connected to the projection 53 on the forked bracket 38.

Various modifications may be made in this invention without departing from the spirit thereof or the scope of the claims, and therefore the exact forms shown are to be taken as illustrative only, and not in a limiting sense and it is desired that only such limitations shall be placed thereon as are disclosed in the prior art, or are set forth in the accompanying claims.

What I claim as my invention is:

1. A lifting device for a vehicle, comprising slidable telescoping members, mounted on said vehicle, one of said slidable members having a slot formed therein, means cooperable with said slot for holding said slidable member from turning while said slidable member is being raised or lowered, means for releasing said slotted member when said member reaches its lowest or highest point of travel, a screw for raising or lowering said slotted member, means for locking said screw and slotted member thereby causing said slotted member to revolve when said slotted member is at its lowest or highest point of travel, and means for rotating said screw and slotted member.

2. A parking device for a vehicle, comprising tubular telescoping members mounted on said vehicle, a motor mounted on one of said telescopic members, a wheel mounted on and geared to the inner member, a screw cooperable with said inner member and said motor for raising and lowering said inner member and for rotating said wheel when said inner member is in its lower position, and means for holding said wheel in a transverse plane to said vehicle.

3. A parking device for a vehicle, comprising a stationary member and a slidable movable member, said slidable movable member being threaded and having a wheel mounted thereon, means for preventing said movable member from turning when said member is being raised or lowered, means for releasing said slidable member when said slidable member reaches its lower position so that said member can rotate, a screw threaded in said movable member for raising and lowering said movable member and wheel, means for locking said slidable movable member and screw when said threaded slidable movable member reaches its lower position, means for rotating said screw, slidable threaded movable member, and wheel, and means for holding said wheel in a transverse plane to said vehicle.

4. A parking device for a vehicle, comprising inner and outer tubular telescoping members mounted on said vehicle, the inner member having a wheel mounted thereon and geared thereto, means for raising and lowering said member, means for reversing the rotation of said wheel to shift said vehicle transversely in either direction, means for holding said wheel in a transverse plane to said vehicle, and means for connecting said raising and lowering means to a motor.

ALBERT C. HOECKER.